(12) United States Patent
Ishikuri

(10) Patent No.: US 10,595,186 B2
(45) Date of Patent: Mar. 17, 2020

(54) COMMUNICATION APPARATUS CAPABLE OF SWITCHING CONNECTION TO EXTERNAL APPARATUS, METHOD OF CONTROLLING THE SAME, AND STORAGE MEDIUM

(71) Applicant: CANON KABUSHIKI KAISHA, Tokyo (JP)

(72) Inventor: Ryuichi Ishikuri, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/969,827

(22) Filed: May 3, 2018

(65) Prior Publication Data

US 2018/0332458 A1 Nov. 15, 2018

(30) Foreign Application Priority Data

May 11, 2017 (JP) ................................ 2017-094876

(51) Int. Cl.
| | |
|---|---|
| *H04W 76/14* | (2018.01) |
| *H04W 8/00* | (2009.01) |
| *H04W 4/80* | (2018.01) |
| *H04W 4/23* | (2018.01) |
| *H04W 12/00* | (2009.01) |

(52) U.S. Cl.
CPC ............ *H04W 8/005* (2013.01); *H04W 4/23* (2018.02); *H04W 4/80* (2018.02); *H04W 76/14* (2018.02); *H04W 12/003* (2019.01)

(58) Field of Classification Search
CPC ....... H04W 8/005; H04W 76/14; H04W 4/80; H04W 4/23
See application file for complete search history.

(56) References Cited

U.S. PATENT DOCUMENTS

| | | | | |
|---|---|---|---|---|
| 2012/0320413 | A1* | 12/2012 | Nagasaki | .............. H04W 8/005 358/1.15 |
| 2013/0029589 | A1* | 1/2013 | Bontu | ................... H04W 16/14 455/7 |
| 2018/0309801 | A1* | 10/2018 | Rathod | ................... H04L 51/04 |

FOREIGN PATENT DOCUMENTS

JP 2015-122695 A 7/2015

* cited by examiner

*Primary Examiner* — Wei Zhao
(74) *Attorney, Agent, or Firm* — Cowan, Liebowitz & Latman, P.C.

(57) ABSTRACT

A communication apparatus comprises: at least one processor or circuit configured to perform operations of following units: a communication unit configured to establish a connection with an external device for communication; and a control unit configured to control, in accordance with information pertaining to a connection request received from a second external device while a connection is established with a first external device, whether or not to cause the communication unit to establish a connection with the second external device instead of the first external device, wherein the control unit causes a connection to be established with the second external device in a case where the information pertaining to the connection request includes information shared in advance with the second external device instead of predetermined information specifying a device to be connected.

16 Claims, 10 Drawing Sheets

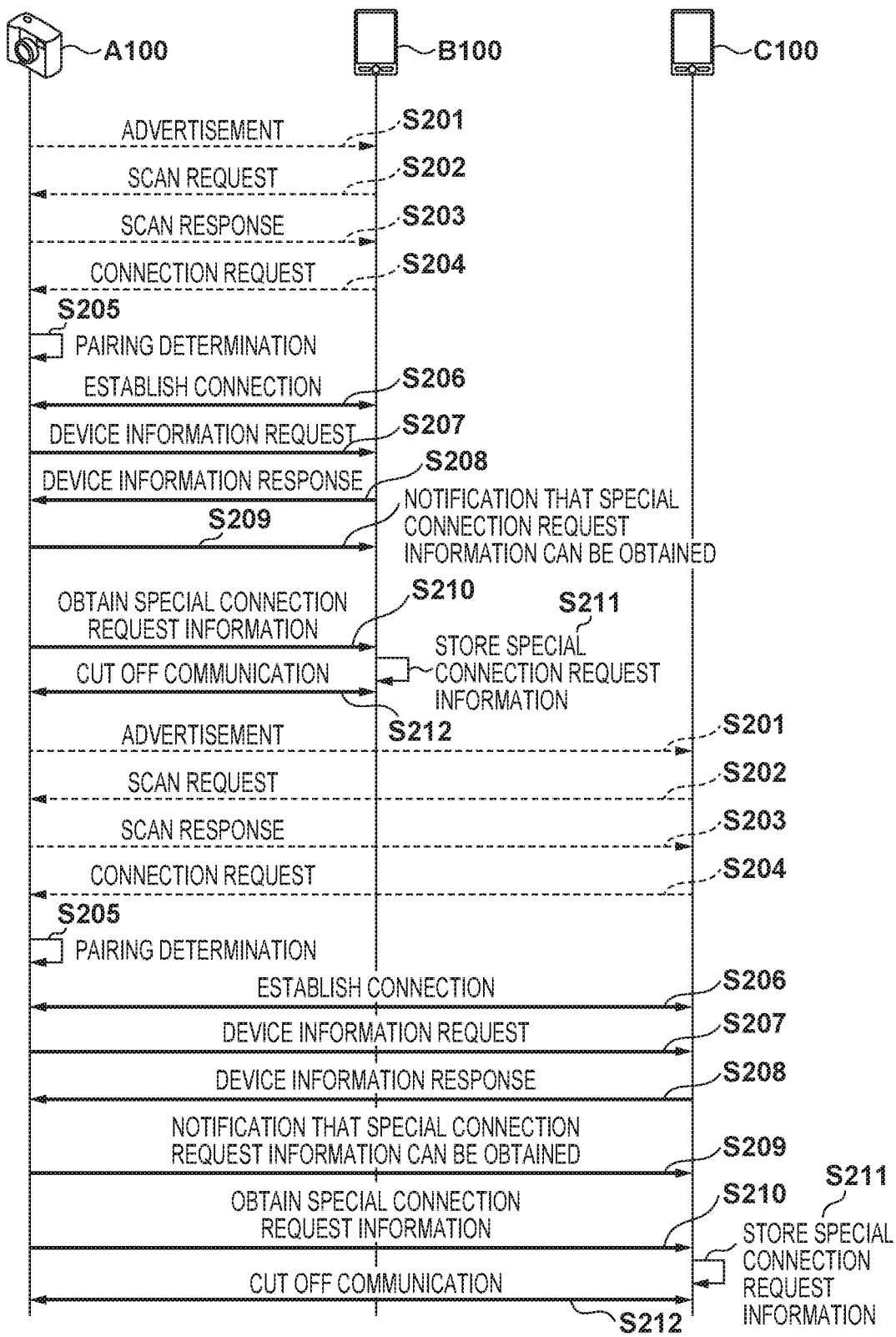

CONNECTION REQUEST PACKET ~250

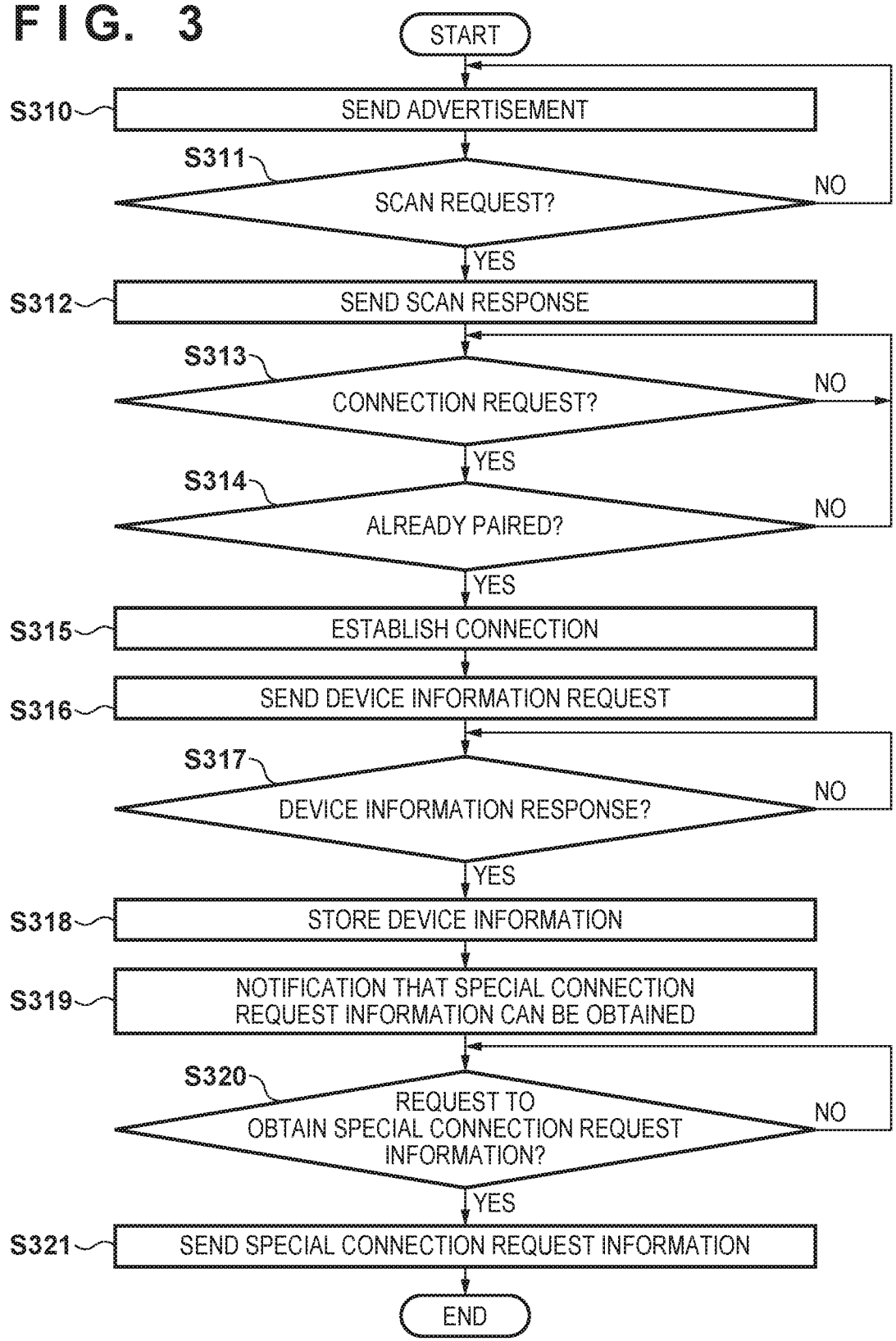

COMMUNICATION APPARATUS CAPABLE OF SWITCHING CONNECTION TO EXTERNAL APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

Bluetooth (registered trademark) Low Energy (also called simply "BLE" hereinafter) has recently become known as a wireless communication method that reduces energy consumption by reducing communication speeds, and is being employed in many types of devices. However, if several devices using BLE are present within a given range, determining which devices should establish connections with each other can be a problem.

In response to this issue, Japanese Patent Laid-Open No. 2015-122695 discloses a technique in which when advertising packets are sent from a plurality of peripheral devices (peripherals) to a single center device (central), and a connection is preferentially established with a peripheral device that has sent a prioritized selection request packet.

However, according to the technique disclosed in Japanese Patent Laid-Open No. 2015-122695, a single central selects a single high-priority peripheral from among a plurality of peripherals attempting to establish connections, and establishes a connection with the selected peripheral.

In other words, in an environment where, for example, there is a single peripheral and a plurality of centrals, there is only one peripheral issuing an advertising packet, meaning that there is no guarantee that communication will be established with the desired central. Furthermore, no consideration is given to other useful usage scenarios, such as a situation where a peripheral is already connected to a central, but a user operates a new, unconnected central and switches the connection of the peripheral to the new central.

SUMMARY OF THE INVENTION

The present invention has been made in consideration of the aforementioned problems, and realizes a communication technique that makes it possible for the connection of a peripheral device connected to a central device to be easily switched to a connection with a desired unconnected central device.

In order to solve the aforementioned problems, one aspect of the present invention provides a communication apparatus comprising: at least one processor or circuit configured to perform operations of following units: a communication unit configured to establish a connection with an external device for communication; and a control unit configured to control, in accordance with information pertaining to a connection request received from a second external device while a connection is established with a first external device, whether or not to cause the communication unit to establish a connection with the second external device instead of the first external device, wherein the control unit causes a connection to be established with the second external device in a case where the information pertaining to the connection request includes information shared in advance with the second external device instead of predetermined information specifying a device to be connected.

Another aspect of the present invention provides a communication apparatus comprising: at least one processor or circuit configured to perform the operations of following units: a communication unit configured to establish a connection with an external device to communicate with the external device; an operating unit configured to receive, while a first external device has established a connection with a second external device, a predetermined user operation for sending a connection request in response to a beacon signal sent from a first communication apparatus; and a control unit configured to control the communication unit to send the connection request to the first external device in response to the predetermined user operation being received, wherein the control unit controls the communication unit to send, to the first external device, the communication request including information shared in advance with the first communication apparatus instead of predetermined information specifying a source device.

Still another aspect of the present invention provides a control method of a communication apparatus comprising: establishing a connection with an external device to communicate with the external device; and controlling, in accordance with information pertaining to a connection request received from a second external device while a connection is established with a first external device, whether or not to cause a connection to be established with the second external device instead of the first external device, wherein in the controlling, a connection is caused to be established with the second external device in a case where the information pertaining to the connection request includes information shared in advance with the second external device instead of predetermined information specifying a device to be connected.

Yet another aspect of the present invention provides a non-transitory computer-readable storage medium storing a program for causing a computer to execute a control method of a communication apparatus comprising: establishing a connection with an external device to communicate with the external device; and controlling, in accordance with information pertaining to a connection request received from a second external device while a connection is established with a first external device, whether or not to cause a connection to be established with the second external device instead of the first external device, wherein in the controlling, a connection is caused to be established with the second external device in a case where the information pertaining to the connection request includes information shared in advance with the second external device instead of predetermined information specifying a device to be connected.

According to the present invention, the connection of a peripheral device connected to a central device can be easily switched to a connection with a desired unconnected central device.

Further features of the invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2A is a sequence chart illustrating a process of communicating special connection request information.

FIG. 3 is a flowchart illustrating a process of communicating special connection request information of a digital camera according to the first embodiment.

DESCRIPTION OF THE EMBODIMENTS

First Embodiment

Hereinafter, exemplary embodiments of the present invention will be described in detail with reference to the drawings. The following describes an example of using a digital camera, a smartphone, and a tablet device that can connect to each other as an example of a communication system. However, the embodiments are not limited to these devices, and can be similarly applied in other devices for which connections among a plurality of devices can be controlled. Such devices include video cameras, personal computers, game consoles, music players, household virtual assistant terminals, VR and AR goggle devices, watch- or eyeglass-type information terminals, medical devices, devices in automobile-installed systems, and so on, for example.

Configuration of Communication System

Figure 1:
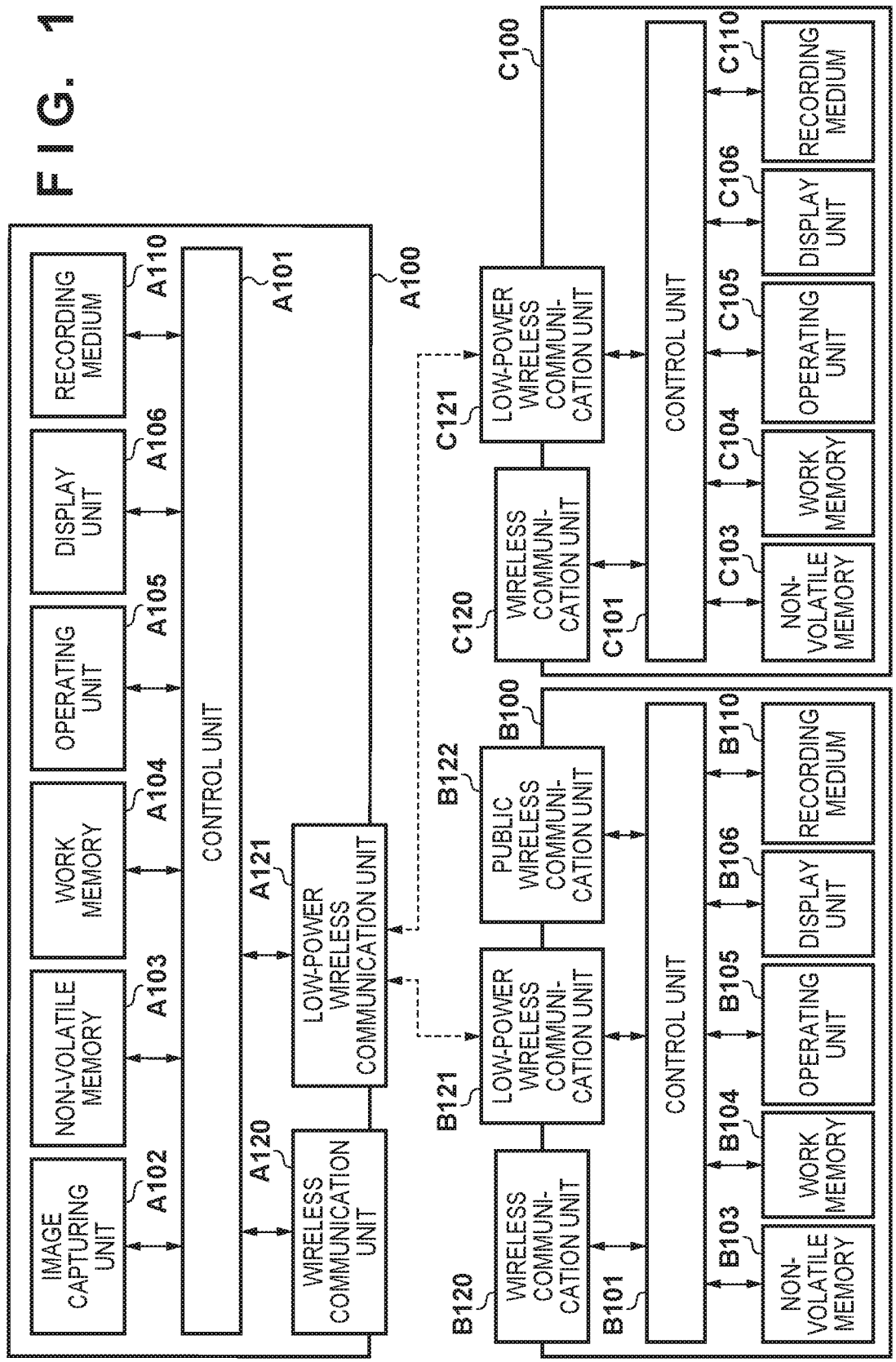
FIG. 1 is a block diagram illustrating an example of the functional configuration of devices constituting a communication system according to a first embodiment.

FIG. 1 is a block diagram illustrating examples of the functional configurations of a digital camera A100, a smartphone B100, and a tablet C100 constituting an example of a communication system according to the present embodiment. Note that one or more of the function blocks illustrated in FIG. 1 may be implemented by hardware such as an ASIC or a programmable logic array (PLA), or may be implemented by software executed by a programmable processor such as a CPU or an MPU. The function blocks may also be realized as a combination of software and hardware. Accordingly, in the following descriptions, even when different function blocks are indicated as being the primary elements carrying out operations, those function blocks may actually be realized by the same instance of hardware.

The digital camera A100 will be described first.

A control unit A101 includes a processor such as a CPU or a GPU, and controls the various units of the digital camera A100 by loading programs recorded in non-volatile memory A103 into work memory A104 and executing the programs.

An image capturing unit A102 is constituted by, for example, an optical system that controls an optical lens unit as well as aperture, zoom, and focus, an image sensor for converting light (an image) entering through the optical lens unit into an electrical image signal, and so on. The image sensor has a configuration in which a plurality of pixels, each having a photoelectrical conversion element, are arrayed two-dimensionally. The image sensor may be a Complementary Metal Oxide Semiconductor (CMOS) or a Charge Coupled Device Image Sensor (CCD), for example. In response to instructions from the control unit A101, the image capturing unit A102 converts subject light formed by a lens included in the image capturing unit A102 into an electrical signal using the image sensor, and Outputs data (image data) that has furthermore been subjected to noise reduction processing and the like. The image data is recorded in a recording medium A110 according to the Design Rule for Camera File System (DCF) standard, for example.

The non-volatile memory A103 includes non-volatile memory that can be electrically erased and recorded, such as EEPROM, and stores programs executed by the control unit A101, setting values of the digital camera A100, and so on. The work memory A104 includes volatile memory such as DRAM, and functions as buffer memory that temporarily holds image data captured by the image capturing unit A102, image display memory for a display unit A106, a work area for the control unit A101, and so on.

An operating unit A105 includes operating members such as a power button for turning the power of the digital camera A100 on and off, a release switch for instructing an image to be captured, a playback button for instructing image data to be played back, and so on, and accepts instructions from a user. In addition to the operating members such as buttons and switches, a touch panel formed in the display unit A106 is included in the operating unit A105.

The display unit A106 includes a display panel such as a liquid crystal or organic EL panel, and displays a live view when preparing to capture a still image, still image data that has been captured, a Graphical User Interface (GUI) for carrying out interactive operations, and the like. Note that the display unit A106 does not necessarily have to be built into the digital camera. A100, and the configuration may instead be such that the digital camera A100 is connected to an external display unit over a hard-wired or wireless connection. In this case, it is sufficient for the digital camera A100 to have at least a display control function for controlling the display in the external display unit.

A power management unit A107 is a unit for supplying power to operate the digital camera A100. The recording medium A110 includes a recording medium constituted by semiconductor memory or the like, and records the image data output from the image capturing unit A102. The recording medium A110 may be configured to be removable from the digital camera A100, or may be built into the digital camera A100. In other words, it is sufficient for the digital camera A100 to at least have means for accessing the recording medium A110.

A wireless communication unit A120 includes an interface for wireless LAN communication based on the IEEE 802.11 standard. In other words, using the wireless communication unit A120, the digital camera A100 can communicate with an access point through wireless LAN communication. Furthermore, by using a higher-level protocol such as TCP/IP, the digital camera A100 can, via the access point, exchange data with a server device connected to a cloud network.

A low-power wireless communication unit A121 includes, for example, an antenna for wireless communication, a modulation/demodulation circuit and a communication controller for processing wireless signals, and so on. The low-power wireless communication unit A121 implements near-field communication based on the IEEE 802.15 standard (Bluetooth (registered trademark); also called simply "BT communication") by outputting modulated wireless signals from the antenna or demodulating wireless signals received by the antenna. In the present embodiment, this communication uses Bluetooth (registered trademark) Low Energy (also called simply "BLE") version 4.0, for example, which provides low energy consumption. BT communication has a smaller communicable range than wireless LAN communication (that is, the communicable distance is short), and the communication speed is slower than wireless LAN communication as well. However, BT communication consumes less power than wireless LAN communication.

The smartphone B100 will be described next.

A control unit B101 includes a processor such as a CPU or a GPU, and controls the various units of the smartphone B100 by loading programs (described later) recorded in non-volatile memory B103 into work memory B104 and executing the programs.

The non-volatile memory B103 includes non-volatile memory that can be electrically erased and recorded, such as EEPROM, and stores programs (described later) executed by the control unit B101, setting values of the smartphone B100, and so on. The work memory B104 includes volatile memory such as DRAM, and functions as image display memory for a display unit B106, a work area for the control unit B101, and so on.

An operating unit B105 includes operating members such as a power button for turning the power of the smartphone B100 on and off, an operating button for instructing screen transitions, and so on, and accepts instructions from a user. In addition to the operating members such as buttons and switches, a touch panel formed in the display unit B106 is included in the operating unit B105.

The display unit B106 includes a display panel such as a liquid crystal or organic EL panel, and displays image data, a GUI for carrying out interactive operations, and the like. Note that the display unit B106 does not absolutely have to be built into the smartphone B100, and it is sufficient for the smartphone B100 to have at least a display control function for controlling content to be displayed.

A power management unit B107 supplies power to operate the smartphone B100. A recording medium B110 includes a recording medium constituted by semiconductor memory or the like, and can record, for example, data generated by programs (e.g. applications) executed by the control unit B101, data downloaded from external devices, and so on. The recording medium B110 may be configured to be removable from the smartphone B100, or may be built into the smartphone B100. In other words, it is sufficient for the smartphone B100 to at least have means for accessing the recording medium B110.

A wireless communication unit B120 may be equivalent to the above-described wireless communication unit A120, and thus includes an interface for wireless LAN communication based on the IEEE 802.11 standard. Likewise, a low-power wireless communication unit B121 may be equivalent to the low-power wireless communication unit A121, and thus includes, for example, an interface that implements near-field communication based on the above-described BLE.

A public wireless communication unit B122 includes an interface for implementing communication using a public network via a base station. The public wireless communication unit B122 is constituted by an antenna for wireless communication and a modulation/demodulation circuit, a communication controller, and so on for processing wireless signals, and implements public line wireless communication based on a standard such as W-CDMA (UNITS) or Long-Term Evolution (LTE).

The tablet C100 will be described next.

A control unit C101 includes a processor such as a CPU or a GPU, and controls the various units of the tablet C100 by loading programs recorded in non-volatile memory C103 into work memory C104 and executing the programs.

The non-volatile memory C103 includes non-volatile memory that can be electrically erased and recorded, such as EEPROM, and stores programs executed by the control unit C101, setting values of the tablet C100, and so on. The work memory C104 includes volatile memory such as DRAM, and functions as image display memory for a display unit C106, a work area for the control unit C101, and so on.

An operating unit C105 includes operating members such as a power button for turning the power of the tablet C100 on and off. The operating unit C105 may also include a mouse and a keyboard. Furthermore, a touch panel formed in the display unit C106 is included in the operating unit C105.

The display unit C106 displays image data, a GUI for interactive operations, and so on. Note that the display unit C106 does not absolutely have to be built into the tablet C100, and it is sufficient for the tablet C100 to have at least a display control function for controlling content to be displayed.

A power management unit C107 supplies power to operate the tablet C100. A recording medium C110 includes a recording medium constituted by semiconductor memory or the like, and can record, for example, data generated by programs (e.g. applications) executed by the control unit C101, data downloaded from external devices, and so on. The recording medium C110 may be configured to be removable from the tablet C100, or may be built into the tablet C100. In other words, it is sufficient for the tablet C100 to at least have means for accessing the recording medium C110.

A wireless communication unit C120 may be equivalent to the above-described wireless communication unit A120, and thus includes an interface for wireless LAN communication based on the IEEE 802.11 standard. Likewise, a low-power wireless communication unit C121 may be equivalent to the low-power wireless communication unit A121, and thus includes, for example, an interface that implements near-field communication based on the above-described BLE.

Process of Communicating Special Connection Request Information Flow of Processing in System The flow of a process for communicating special connection request information according to the present embodiment will be described next with reference to FIG. 2A. FIG. 2A illustrates the process for communicating the special connection request information in the communication system according to the present embodiment. In the example described hereinafter, the smartphone B100 or the tablet C100 obtains the special connection request information from the digital camera A100. Here, even if the digital camera A100 has established a connection with a device such as the smartphone B100, a new device such as the tablet C100 can establish a new connection with the digital camera A100. Note that in the example illustrated in FIG. 2A, the digital camera A100 is a peripheral device, and the smartphone B100 and the tablet C100 are central devices. The digital camera A100 does not establish connections with the smartphone B100 and the tablet C100 simultaneously. It is furthermore assumed that the digital camera A100 is paired with the smartphone B100 and the digital camera. A100 is paired with the tablet C100 in advance. "Pairing" is a process of exchanging encryption keys for encrypting communication as defined by the BLE communication standard. In the example described in the present embodiment, BLE communication connections are established only with devices that have been successfully paired.

In step S201, the digital camera A100, which is a peripheral, sends an advertisement. An "advertisement" is a beacon signal in which the destination device is unspecified, and any device present within a predetermined distance from the digital camera A100 (within a BLE communication range) can receive that beacon signal. A device that has received the advertisement can detect that the digital camera A100 is within the BLE communication range and send a connection request. The example illustrated in FIG. 2A assumes that the smartphone B100 is within the BLE communication range. Note that in this process, the digital camera A100 sends and receives the signals pertaining to BLE through the low-power wireless communication unit A121.

In step S202, the smartphone B100 receives, through the low-power wireless communication unit B121, the advertisement sent from the digital camera A100 in step S201. Upon receiving the advertisement, the smartphone B100 sends, through the low-power wireless communication unit B121, a scan request for starting a connection with the digital camera A100. Note that in this process, the smartphone B100 sends and receives the signals pertaining to BLE using the low-power wireless communication unit B121.

In step S203, upon receiving the scan request sent from the smartphone B100 in step S202, the digital camera A100 sends a scan response.

In step S204, upon receiving the scan response sent from the digital camera A100 in step S203, the smartphone B100, which is a central, sends a connection request including an encryption key used in establishing a connection. In step S205, the digital camera A100 makes a pairing judgment. In other words, the digital camera A100 confirms the encryption key in the connection request sent from the smartphone B100 in step S204 and determines whether the connection request is a request from a paired device. If it is determined that the connection request is from a paired device, the digital camera A100 establishes a BLE connection with the smartphone B100 in step S206. Note that the process ends if the digital camera A100 determines that the connection request is from an unpaired device.

In step S207, the digital camera A100 sends a device information request to the smartphone B100. The "device information" is an initiator address of the smartphone B100. An "initiator address" is unique address information held by a device that sends a connection request, such as the smartphone B100 or the tablet C100, and constitutes a communication packet of the connection request in step S204. The initiator address is set, for example, by the manufacturer of a product when the product is shipped.

Figure 2B:
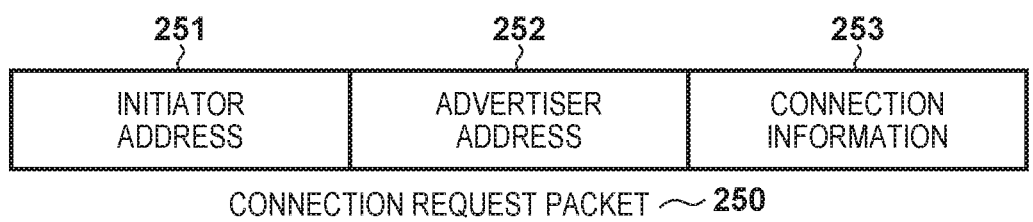
FIG. 2B is a table illustrating a connection request packet according to the first embodiment.

The configuration of a connection request packet will be described here with reference to FIG. 2B. As illustrated in FIG. 2B, a connection request packet 250 is constituted by an initiator address 251, an advertiser address 252, and connection information 253. The advertiser address 252 is unique address information held by a device that issues an advertisement, such as the digital camera A100, and is set, for example, by the manufacturer of a product when the product is shipped. The advertiser address 252 constitutes a communication packet of the advertisement in step S201, and can be obtained by receiving the advertisement. The connection information 253 includes address information used after connecting, information of a communication timeout time, and so on.

Referring once again to FIG. 2A, in step S208, the digital camera A100 receives a device information response returned from the smartphone B100. At this time, the digital camera A100 stores the received device information of the smartphone B100 in the non-volatile memory A103.

In step S209, the digital camera A100 sends, to the smartphone B100, a notification that special connection request information can be obtained. In the present embodiment, the special connection request information includes a special initiator address assigned to a BLE communication connection destination device. In other words, the digital camera A100 generates, as the special initiator address, a value unique to each device for which a normal initiator address according to the BLE standard is not set, and communicates that value to the smartphone B100. In the example illustrated in FIG. 2A, the digital camera A100 communicates that the special initiator address can be generated and sent, and thus the smartphone B100 can easily know that the special connection request information can be obtained from the digital camera A100.

In step S210, upon receiving the notification that special connection request information can be obtained from the digital camera A100 in step S209, the smartphone B100 obtains the special connection request information from the digital camera A100 (receives a notification of the special connection request information). Furthermore, in step S211, the special connection request information obtained in step S210 is stored in the non-volatile memory B103. Then, in step S212, the digital camera A100 cuts off the BLE communication with the smartphone B100.

The digital camera A100 then repeats the processes of steps S201 to S212 for the tablet C100 as well, and the special connection request information of the digital camera A100 is stored in the tablet C100. The processes for the tablet C100, which is a central, are the same as the processes for the smartphone B100, which is also a central. As such, the same reference signs are assigned, and descriptions thereof will be omitted.

Sequence of Operations by Digital Camera A100

A sequence of operations performed by the digital camera A100 for implementing the above-described processes from the advertisement (step S201) to the obtainment of the special connection request information (step S210) will be described next with reference to FIG. 3. FIG. 3 illustrates a sequence of operations performed by the digital camera A100 according to the present embodiment in the process of communicating the special connection request information. Note that the processing in this flowchart is realized by the control unit A101 loading a program stored in the non-volatile memory A103 into the work memory A104 and executing the program to control the various units of the digital camera A100. Unless otherwise noted, the same applies to the processes in the flowcharts illustrating operations performed by the digital camera A100 described below.

In step S310, the control unit A101 sends an advertisement through the low-power wireless communication unit A121 (this corresponds to the process of step S201 described above). In step S311, the control unit A101 determines whether a scan request has been made in response to the advertisement sent in step S310. The control unit A101 determines whether a signal received through the low-power wireless communication unit A121 is a scan request, for example. If the control unit A101 determines that there has been a scan request, the process moves to step S312. If the control unit A101 determines that there has not been a scan request, the process returns to step S310 and is repeated. Note that the process of an external device sending a scan request carried out in this step corresponds to the process of step S202 described above.

In step S312, the control unit A101 sends a scan response through the low-power wireless communication unit A121 (this corresponds to the process of step S203 described above).

In step S313, the control unit A101 determines whether a connection request has been made in response to the scan response sent in step S312. The control unit A101 determines whether a signal received through the low-power wireless communication unit A121 is a connection request, for example. If the control unit A101 determines that there has been a connection request, the process moves to step S314. If the control unit A101 determines that there has not been a connection request, the process returns to step S313 and is repeated. Note that the process of an external device sending a connection request carried out in this step corresponds to the process of step S204 described above.

In step S314, the control unit A101 determines whether the connection request received in step S313 has been received from a paired device (this corresponds to the process of step S205 described above). If the device is determined to be paired, the process moves to step S315. If the device is determined to be unpaired, the process returns to step S313.

In step S315, the control unit A101 establishes a BLE connection with the smartphone B100 through the low-power wireless communication unit A121 (this corresponds to the process of step S206 described above). Furthermore, in step S316, the control unit A101 sends a device information request to the smartphone B100 through the low-power wireless communication unit A121 (this corresponds to the process of step S207 described above).

In step S317, the control unit A101 determines whether a device information response has been made in response to the device information request sent in step S316. The control unit A101 determines whether a signal received through the low-power wireless communication unit A121 is a device information response, for example. If the signal is determined to be a device information response, the process moves to step S318. If the signal is determined to not be a device information response, the process returns to step S317 and is repeated. Note that the process of this step corresponds to the process of step S208 described above.

In step S318, the control unit A101 stores, in the nonvolatile memory A103, the device information received through the low-power wireless communication unit A121 in step S317 (this corresponds to the process of step S211 described above). In step S319, the control unit A101 sends a notification that special connection request information can be obtained to the smartphone B100 through the low-power wireless communication unit A121 (this corresponds to the process of step S209 described above).

In step S320, the control unit A101 determines whether a request to obtain the special connection request information has been made in response to the notification that special connection request information can be obtained made in step S319. The control unit A101 determines whether a signal received through the low-power wireless communication unit A121 is a request to obtain the special connection request information, for example, and the process moves to step S321 if the signal is determined to be a request to obtain the special connection request information. If the signal is determined to not be a request to obtain the special connection request information, the process of step S320 is repeated so as to wait for that request to be received. This process may be ended if the request to obtain the special connection request information cannot be received even after a predetermined amount of time has passed.

In step S321, the control unit A101 sends the special connection request information to the smartphone B100 through the low-power wireless communication unit A121 (this corresponds to the process of step S210 described above). When the special connection request information has been sent successfully, the control unit A101 ends the sequence of operations involved in this process.

Note that the above-described process of communicating the special connection request by the digital camera A100 is also repeated for communication with the tablet C100, which is a central, so that the tablet C100 obtains the special connection information. This process is the same as the process carried out with the smartphone B100, which is also a central, and thus descriptions thereof will be omitted.

Sequence of Operations by Smartphone B100

Figure 4:
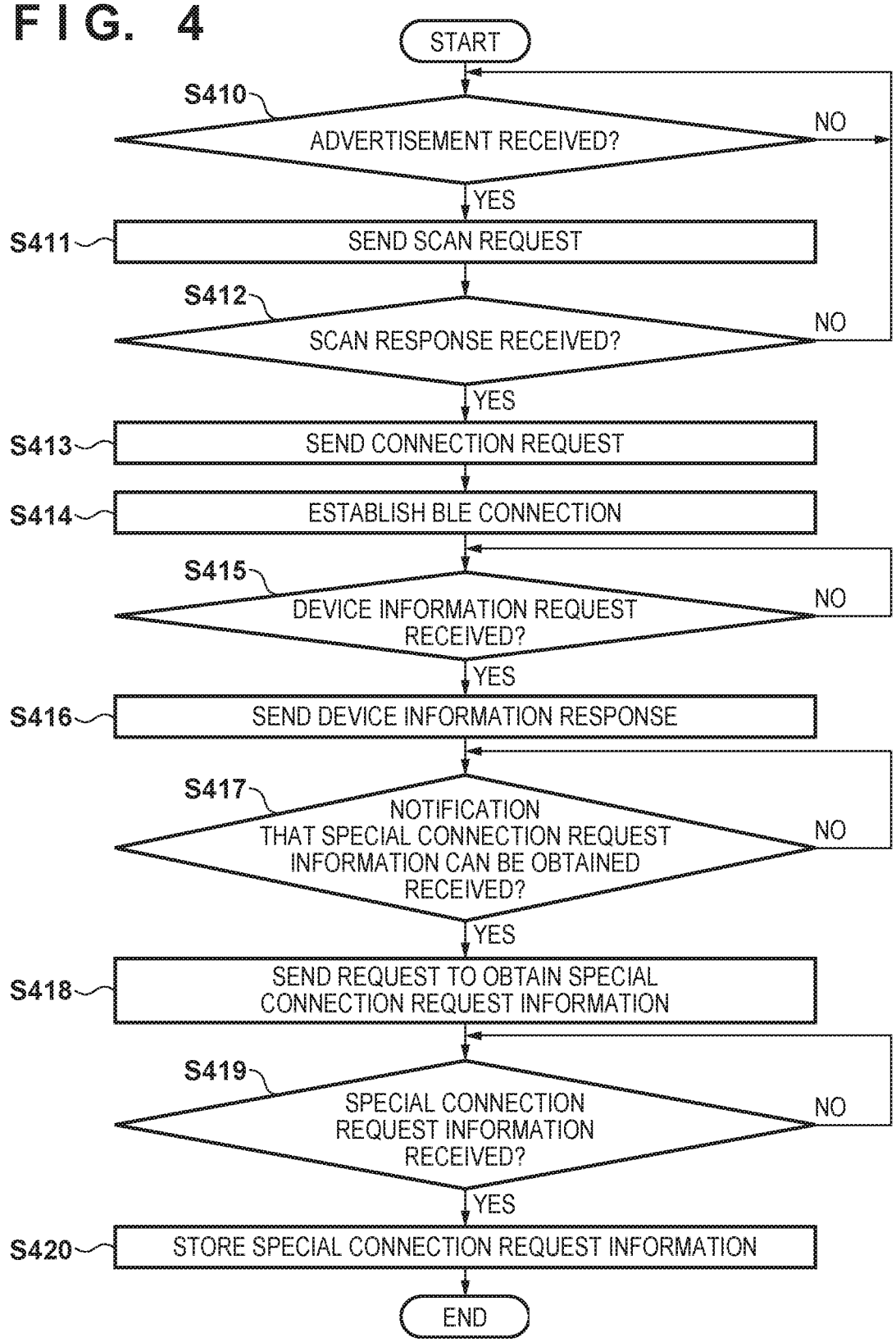
FIG. 4 is a flowchart illustrating a process of communicating special connection request information of a smartphone according to the first embodiment.

A sequence of operations performed by the smartphone B100 for implementing the above-described processes from the advertisement (step S201) to the obtainment of the special connection request information (step S210) will be described next with reference to FIG. 4. FIG. 4 illustrates a sequence of operations performed by the smartphone B100 according to the present embodiment in the process of communicating the special connection request information. Note that the processing in this flowchart is realized by the control unit B101 loading a program stored in the nonvolatile memory B103 into the work memory B104 and executing the program to control the various units of the smartphone B100. Unless otherwise noted, the same applies to the processes in the flowcharts illustrating operations performed by the smartphone B100 described below.

In step S410, the control unit B101 determines whether an advertisement has been received (this corresponds to the process of step S201 described above). The control unit B101 determines whether a signal received through the low-power wireless communication unit B121 is an advertisement, for example, and if it is determined that such a signal has been received, the process moves to step S411. If it is determined that such a signal has not been received, the process of step S410 is repeated so as to wait for an advertisement to be received.

In step S411, the control unit B101 sends a scan request through the low-power wireless communication unit B121 (this corresponds to the process of step S202 described above). In step S412, the control unit B101 determines whether a scan response has been received (this corresponds to the process of step S203 described above). The control unit B101 determines whether a signal received through the low-power wireless communication unit B121 is a scan response, for example. If it is determined that a scan response has been received, the process moves to step S413. If it is determined that a scan response has not been received, the process returns to step S410.

In step S413, the control unit B101 sends a connection request through the low-power wireless communication unit B121 (this corresponds to the process of step S204 described above). In step S414, the control unit B101 establishes a BLE connection with the digital camera A100 through the low-power wireless communication unit B121 (this corresponds to the process of step S206 described above).

In step S415, the control unit B101 determines whether a device information request has been received (this corresponds to the process of step S207 described above). The control unit B101 determines whether a signal received through the low-power wireless communication unit B121 is a device information request, for example, and if it is determined that such a request has been received, the process moves to step S416. If it is determined that such a request has not been received, the process returns to step S415 and is repeated. In step S416, the control unit B101 sends the device information through the low-power wireless communication unit B121 (this corresponds to the process of step S208 described above).

In step S417, the control unit B101 determines whether a notification that special connection request information can be obtained has been received. The control unit B101 determines whether a signal received through the low-power wireless communication unit B121 is a notification that special connection request information can be obtained (this corresponds to the process of step S209 described above). If it is determined that a notification that special connection request information can be obtained has been received, the process moves to step S418. If it is determined that such a notification has not been received, the process of step S417 is repeated so as to wait for the notification to be received. Note that it may be determined whether the notification that special connection request information can be obtained has been received within a predetermined amount of time, and this sequence of operations may be ended if the notification is not received within the predetermined amount of time.

In step S418, the control unit B101 sends a special connection request information obtainment request through the low-power wireless communication unit B121 (this corresponds to the process of step S210). In step S419, the control unit B101 determines whether the special connection request information obtainment request has been received through the low-power wireless communication unit B121 (this corresponds to the process of step S210). If it is determined that the special connection request information has been received, the process moves to step S420, and if it is determined that the information has not been received, the process of step S419 is repeated. In step S420, the control unit B101 stores the special connection request information received in step S417 in the non-volatile memory B103 (this corresponds to the process of step S211 described above), and this sequence of processes then ends.

Note that the operations performed by the smartphone B100, which is a central, in the above-described process of communicating the special connection request information are the same as the operations performed by the tablet C100, which is also a central. Accordingly, descriptions of operations performed by the tablet C100 in the process of communicating the special connection request information will be omitted.

Process of Switching Connected Device Flow of Processing in System

Figure 5:
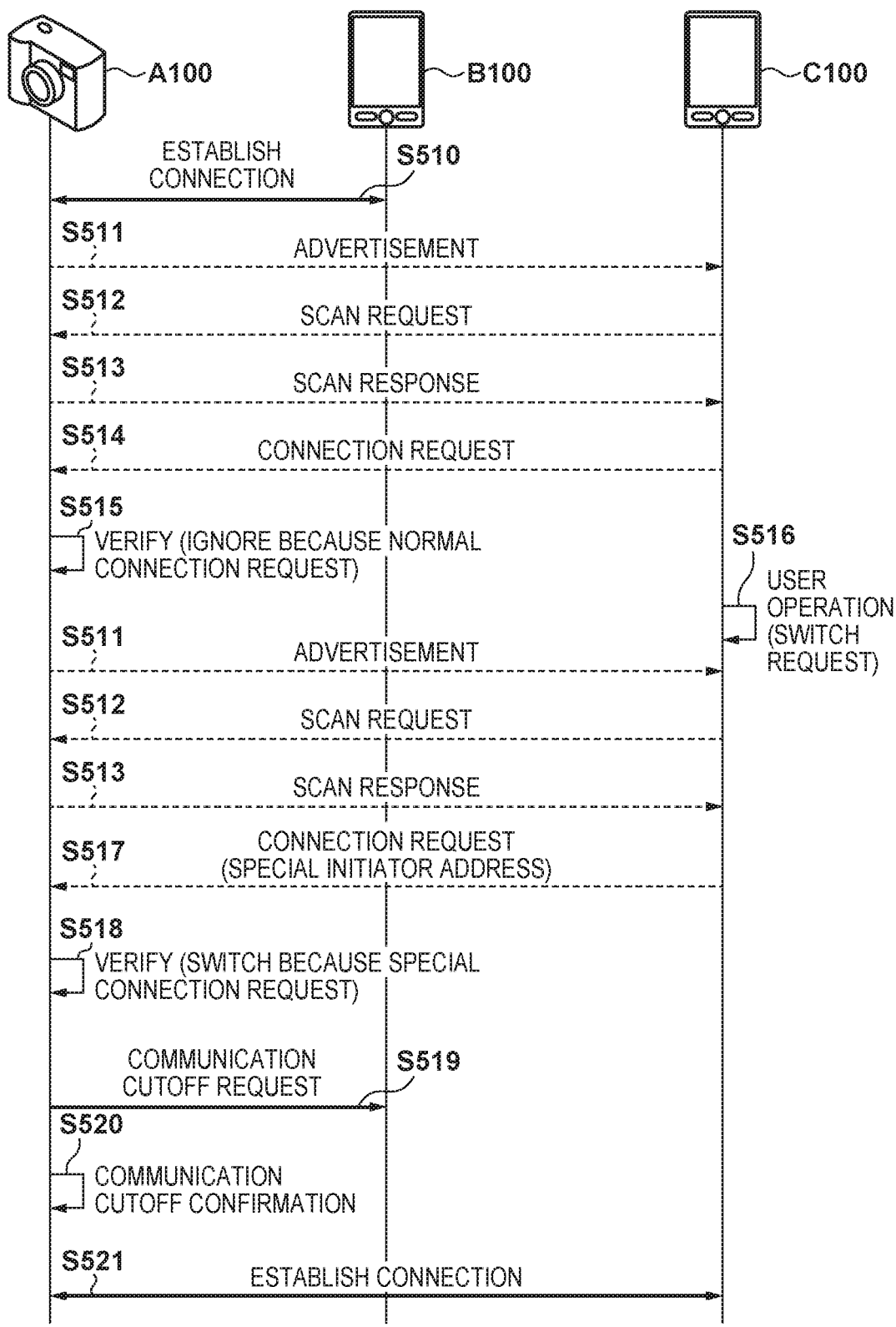
FIG. 5 is a sequence chart illustrating a connected device switching process according to the first embodiment.

A process of switching a connected device according to the present embodiment will be described next with reference to FIG. 5. FIG. 5 illustrates a sequence of a process of switching a BLE-connected device in the communication system according to the present embodiment. Note that the process of switching the connected device is carried out after the above-described process of communicating the special connection request information.

The following is an overview of the processing in the system according to the present embodiment. Note that a situation in which the digital camera A100 and the smartphone B100 are within a BLE communication range, and BLE communication is established, will be described as an example. This is to enable GPS data and the like held by the smartphone B100 to be received periodically by connecting the digital camera A100 and the smartphone B100 through BLE communication, for example.

First, if in this state the tablet C100 enters the BLE communication range of the digital camera A100, the tablet C100 will attempt to establish a BLE connection with the digital camera A100. However, the digital camera 100 has already established a BLE connection with the smartphone B100 and thus does not respond to the connection request from the tablet C100.

Accordingly, in the present embodiment, the digital camera A100 switches the BLE connection from the smartphone B100 to the tablet C100 in response to a user operating the UI of an image browser app in the tablet C100 in order to browse images in the digital camera A100.

The flow of processing in the system will be described in more detail hereinafter. In step S510, the digital camera. A100 establishes a BLE connection with the smartphone B100.

In step S511, the digital camera A100 sends an advertisement. A device that receives the advertisement and recognizes the presence of the advertisement from the digital camera A100 can detect that the digital camera A100 is within the BLE communication range. In step S512, the tablet C100 sends a scan request in response to receiving the advertisement sent from the digital camera A100.

In step S513, the digital camera 4100 sends a scan response in response to receiving the scan request sent from the tablet C100. In step S514, the tablet C100 receives the scan response sent from the digital camera 4100 and sends a connection request constituted by the connection request packet 250.

In step S515, the digital camera A100 determines whether the initiator address 251 in the received connection request packet 250 is the same as the special initiator address communicated in step S209. In this example, the tablet C100 has not yet received a switch instruction operation, for switching the connection from the smartphone B100 to the tablet C100, from a user. As such, the special initiator address is not included in the connection request (the connection request packet 250) sent by the tablet C100, and the digital camera A100 thus returns to the process of sending the advertisement without switching the BLE-connected device.

On the other hand, in step S516, upon receiving a switch instruction operation from the user, the tablet C100 changes the initiator address used in the connection request to a special initiator address. Then, the digital camera A100, which has returned to the process of sending the advertisement in step S515, and the tablet C100, repeat the processing from the sending of the advertisement to the sending of the scan response (steps S511 to S513).

Next, in step S517, upon receiving the scan response sent from the digital camera A100, the tablet C100 sends a new connection request. The tablet C100 inserts the special initiator address into the connection request packet at this time.

In step S518, the digital camera A100 verifies the initiator address 251 included in the new connection request packet 250 received in step S517. In other words, the digital camera A100 determines whether the initiator address included in the connection request packet 250 is the same as the special initiator address communicated in step S209. In this example, the same special initiator address is included in the new connection request packet 250 received in step S517, and thus the digital camera A100 starts a process of switching the BLE-connected device.

In step S519, the digital camera A100 sends a communication cutoff request to the smartphone B100 that is currently connected in order to switch the connected device. Having received the communication cutoff request, the smartphone B100 terminates the BLE communication. At this time, the smartphone B100 may, for example, notify the user that a communication cutoff request has been received and terminate the BLE communication only in the case where an instruction to cut off the communication has been received from the user.

In step S520, the digital camera A100 stands by until the BLE communication is terminated by the smartphone B100, and once the BILE communication has been ten in step S521, establishes a BLE connection with the tablet C100.

In this manner, when the tablet C100 sends a connection request including a special initiator address in response to a user operation, the digital camera A100 that has received the connection request switches the BLE connection from the smartphone B100 to the tablet C100. Accordingly, the user holding the tablet C100 can terminate the connection between the smartphone B100 and the digital camera A100 and connect the tablet C100 to the digital camera A100 without having to operate the smartphone B100.

Sequence of Operations by Digital Camera A100

Figure 6:
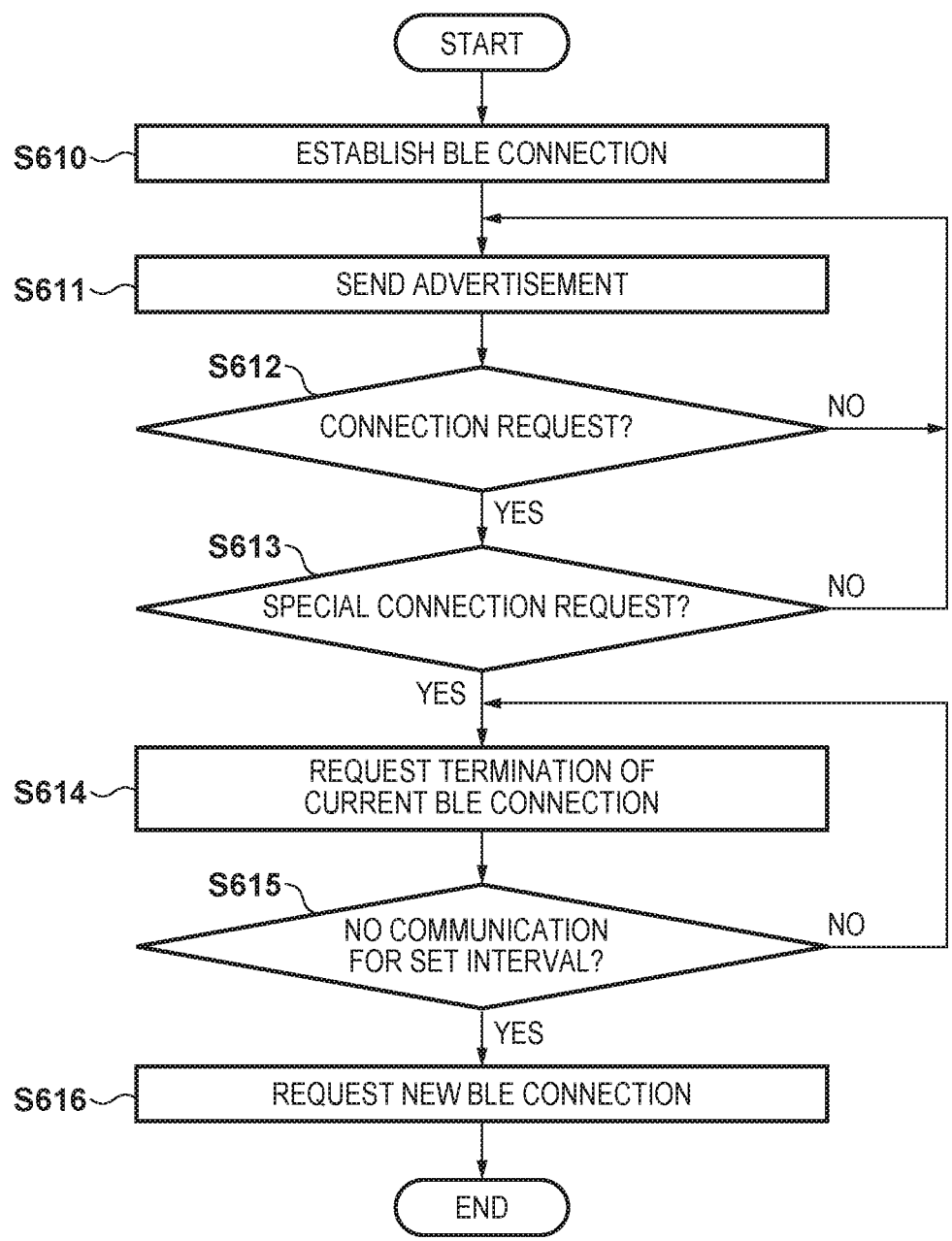
FIG. 6 is a flowchart illustrating a connected device switching process carried out by the digital camera according to the first embodiment.

A sequence of operations performed by the digital camera A100 for implementing the process of switching the connected device will be described next with reference to FIG. 6. FIG. 6 illustrates a sequence of operations performed by the digital camera A100 according to the present embodiment in the process of switching the connected device.

In step S610, the control unit A101 establishes a BLE connection with the smartphone B100 through the low-power wireless communication unit A121 (this corresponds to the process of step S510 described above). In step S611, the control unit A101 sends an advertisement through the low-power wireless communication unit A121.

In step S612, the control unit A101 determines whether a connection request sent from an external device has been received in response to the sent advertisement. The control unit A101 determines whether a signal received through the low-power wireless communication unit A121 is a connection request, for example, and if it is determined that a connection request has been received, the process moves to step S613. On the other hand, if the control unit A101 determines that the request has not been received, the process returns to step S611.

In step S613, the control unit A101 determines whether the initiator address 251 included in the received connection request packet 250 matches the special initiator address communicated in step S319. If the control unit A101 determines that the addresses match, the process moves to step S614. However, if the control unit A101 determines that the initiator address in the received connection request packet does not match the special initiator address, the process returns to step S611 so as to ignore the connection request from the sender (i.e. to not establish BLE communication). In other words, if a normal connection request has been received, the control unit A101 maintains the existing BLE communication and does not establish communication with a new device.

In step S614, the control unit A101 has determined that the initiator address included in the received connection request packet matches the initiator address that has already been communicated, and thus sends a BLE communication cutoff request to the smartphone B100 that is currently connected. Then, in step S615, the control unit A101 determines whether or not the BLE communication with the smartphone B100 has been cut off. In BLE communication, communication must be carried out every set interval to maintain a connected state, and thus the control unit A101 determines whether or not there has been no communication from the smartphone B100 for greater than or equal to a predetermined interval, for example. If the control unit A101 determines that there has been no communication, the process moves to step S616. On the other hand, if the control unit A101 determines that there has been communication, the process returns to step S611 to once again determine whether or not there is communication.

In step S616, upon confirming the cutoff of BLE communication, the control unit A101 establishes BLE communication with the new device that sent the connection request received in step S612. This sequence of operations ends when the control unit A101 has established the BLE connection.

Sequence of Operations in Processing by Tablet C100

Figure 7:
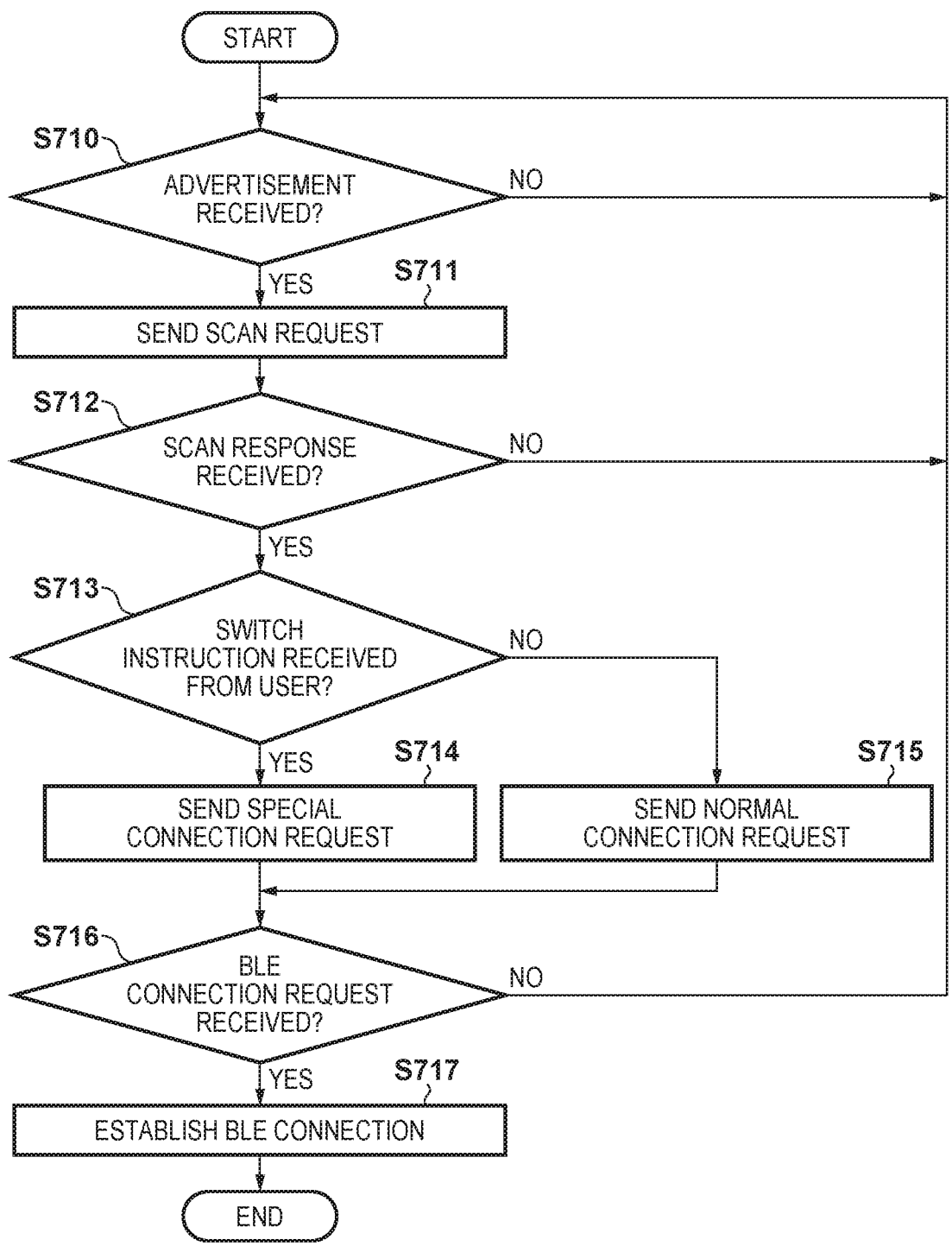
FIG. 7 is a flowchart illustrating a connected device switching process carried out by a tablet according to the first embodiment.

A sequence of operations in the process for switching the connected device, carried out by the tablet C100 to implement the sequence illustrated in FIG. 5, will be described next with reference to FIG. 7. FIG. 7 illustrates a sequence of operations carried out by the tablet C100 according to the present embodiment. Note that the processes illustrated in this flowchart are realized by the control unit C101 of the tablet C100 controlling the units of the tablet C100 by loading a program recorded in the non-volatile memory C103 into the work memory C104 and executing the program. Unless otherwise noted, the same applies to the processes in the flowcharts illustrating operations performed by the tablet C100 described below.

In step S710, the control unit C101 determines whether an advertisement has been received (this corresponds to the process of step S511 described above) The control unit C101 determines whether a signal received through the low-power wireless communication unit C121 is an advertisement, for example, and if it is determined that an advertisement has been received, the process moves to step S711. If it is determined that an advertisement has not been received, the process of step S710 is repeated so as to wait for an advertisement to be received.

In step S711, the control unit C101 sends a scan request through the low-power wireless communication unit C121 (this corresponds to the process of step S512 described above).

In step S712, the control unit C101 determines whether a scan response has been received (this corresponds to the process of step S513 described above) The control unit C101 determines whether a signal received through the low-power wireless communication unit C121 is a scan response, for example. If it is determined that a scan response has been received, the process moves to step S713. If it is determined that a scan response has not been received, the process returns to step S710.

In step S713, the control unit C101 determines whether a switch instruction operation made by the user has been received (this corresponds to the process of step S516 described above). If the control unit C101 has determined that a switch instruction operation from the user has been received through the operating unit C105, e.g. the user has operated the UT of the image browser app in the tablet C100, the process moves to step S714. If it is determined that such an operation has not been received, the process moves to step S715. The switch instruction operation includes, for example, an operation of pressing a button for confirming intent to switch the connection, such as a "switch" or "OK" button displayed in the UI of the image browser app, an operation for selecting or inputting a device name specifying the device to which the connection is to be switched, and so on. An operation for selecting a location in which images are saved for browsing, without explicitly indicating an operation of switching the connection, may serve as the switch instruction operation.

In step S714, the control unit C101 sends a connection request for a special connection through the low-power wireless communication unit C121 (this corresponds to the process of step S517 described above). When generating the connection request packet, the control unit C101 reads out the special initiator address stored in the non-volatile memory C103 in step S420 and inserts that address into the connection request packet.

In step S715, the control unit C101 has not received a switch instruction operation, and this sends a normal connection request through the low-power wireless communication unit C121 (this corresponds to the process of step S514 described above). At this time, the control unit C101 uses a normal initiator address when generating the connection request packet.

In step S717, the control unit C101 establishes a BLE connection with the digital camera A100 through the low-power wireless communication unit C121 (this corresponds to the process of step S521 described above). This sequence of operations ends when the control unit C101 has established the connection with the digital camera A100.

According to the present embodiment as described thus far, if, when a digital camera has a connection established with a first central device, the digital camera receives a new connection request from a second central device, the connection is switched in accordance with an initiator address included in the connection request from the second device. At this time, the digital camera generates a value unique to each central as a special initiator address and communicates that special initiator address to the central devices, and thus a distinction can be made between a normal initiator address and a special initiator address included in a connection request from a central device. Doing so makes it possible for the user to control the connection made by the digital camera A100 simply by operating the device to which the digital camera is to be connected (e.g. the second device). To rephrase, the connection of a peripheral device connected to a central device can be easily switched to a connection with a desired unconnected central device.

In the example given above in the present embodiment, the configuration is such that the special initiator address is generated by the digital camera A100 and communicated to the smartphone B100 and the tablet C100. However, the configuration may instead be such that the special initiator address is generated by the smartphone B100 or the tablet C100 and communicated to the digital camera A100.

Furthermore, the present embodiment describes an example in which the connection of the digital camera A100 is switched unconditionally in response to a switch instruction operation made by the user in the tablet. However, the configuration may be such that when the normal connection request made by the tablet C100 is ignored by the digital camera A100, the user is notified that the digital camera A100 is already connected to another device and is asked if s/he nevertheless wishes to switch the connection.

Second Embodiment

The first embodiment describes an example in which a special initiator address is used as the special connection request information, but the present embodiment describes an example in which a special advertiser address is used as the special connection request information. Note that the configurations of the various devices in the present embodiment are the same as in the first embodiment, and the sequences of operations carried out by the devices are also generally the same. As such, identical configurations and processes will be assigned the same reference signs and redundant descriptions will be omitted, with attention focused on the differences between the embodiments.

Process of Communicating Special Connection Request Information Flow of Processing by System A process for communicating the special connection request information according to the present embodiment will be described first. The flow of the process of communicating the special connection request information according to the present embodiment is the same as in FIG. 2A, but the details of the special connection request information in S210 are different. In other words, in step S210, the digital camera A100 sends the special connection request information to the smartphone B100. At this time, the special connection request information includes a special advertiser address assigned to the digital camera A100. The "advertiser address" is unique address information held by a device that sends an advertisement, such as the digital camera A100, as described above in the first embodiment, and constitutes a communication packet of the connection request made in step S204. The "special advertiser address" is a value for each device for which a normal advertiser address is not set according to the BLE standard, and is generated and sent by the digital camera A100.

Process of Switching Connected Device Flow of Processing by System

Figure 8:
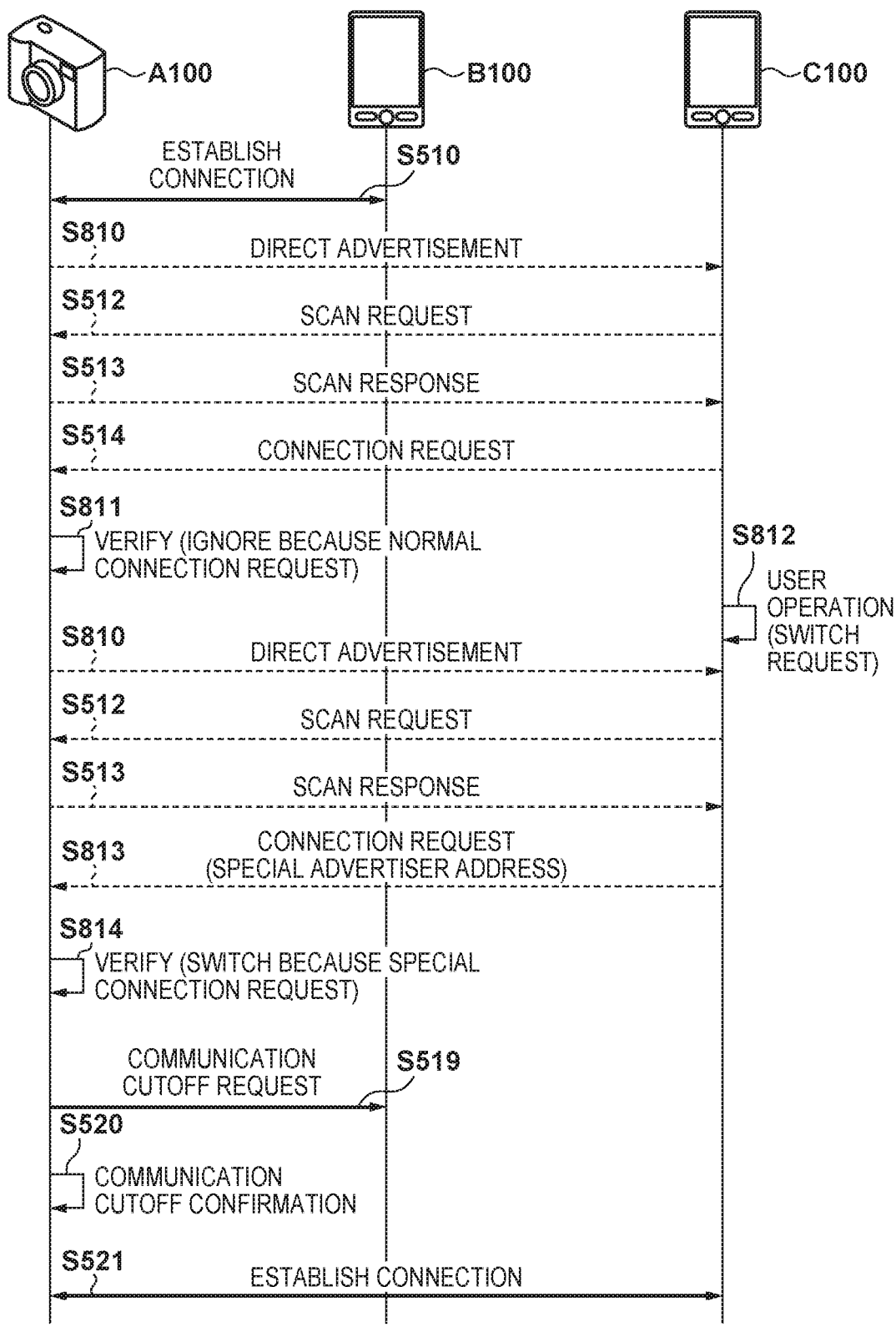
FIG. 8 is a sequence chart illustrating a connected device switching process according to a second embodiment.

The flow of a process of switching a connected device according to the present embodiment will be described next with reference to FIG. 8. FIG. 8 illustrates the flow of the process of switching a connected device in the system according to the present embodiment.

First, a connection is established between the digital camera A100 and the smartphone B100 through the process of S510, in the same manner as in the first embodiment. Then, in step S810, the digital camera A100 sends a direct advertisement to the tablet C100. The "direct advertisement" is a beacon signal in which the destination device is specified. The above-described initiator address is used to specify the destination device. A device that has received a direct advertisement determines whether the initiator address included in the direct advertisement matches its own initiator address, and recognizes the direct advertisement only if it is determined that the initiator addresses match. Having recognized the direct advertisement, the device can detect that the digital camera A100 is within the BLE communication range and send a connection request. The configuration may be such that the digital camera A100 only sends the direct advertisement to a device that is already paired and with which a BLE connection is not currently established. Additionally, the digital camera A100 sends both a direct advertisement using a normal advertiser address and a direct advertisement using the special advertiser address communicated in step S209.

The digital camera A100 and the tablet C100 then carry out the above-described processes of S512 to S514, and the digital camera A100 receives a connection request from the tablet C100.

In step S811, the digital camera A100 determines whether the advertiser address 252 included in the connection request packet 250 received in step S514 is the same as the special advertiser address communicated in step S209. In the example illustrated in FIG. 8, the tablet C100 has at this point in time not yet received a switch instruction operation from the user, and thus the special advertiser address is not included in the connection request sent from the tablet C100. As such, the digital camera A100 returns to the process of sending the direct advertisement without carrying out the process of switching the BLE connection.

On the other hand, in step S812, upon receiving a switch instruction operation from the user, the tablet C100 changes the advertiser address to be used in subsequent connection requests to the special advertiser address (that was communicated by the digital camera A100 in step S209). The digital camera A100 and the tablet C100 then carry out the above-described processes of S512 and S513.

In step S813, the tablet C100 sends a connection request using the special advertiser address. Then, in step S814, the digital camera A100 determines whether the advertiser address included in the received connection request packet is the same as the special advertiser address communicated in step S209. In the example illustrated in FIG. 8, the special advertiser address in the connection request packet received in step S813 is the same as the special advertiser address sent by the digital camera A100. As such, the digital camera A100 carries out the process of switching the BLE connection and establishes a connection with the tablet C100.

Sequence of Operations by Digital Camera A100

Figure 9:
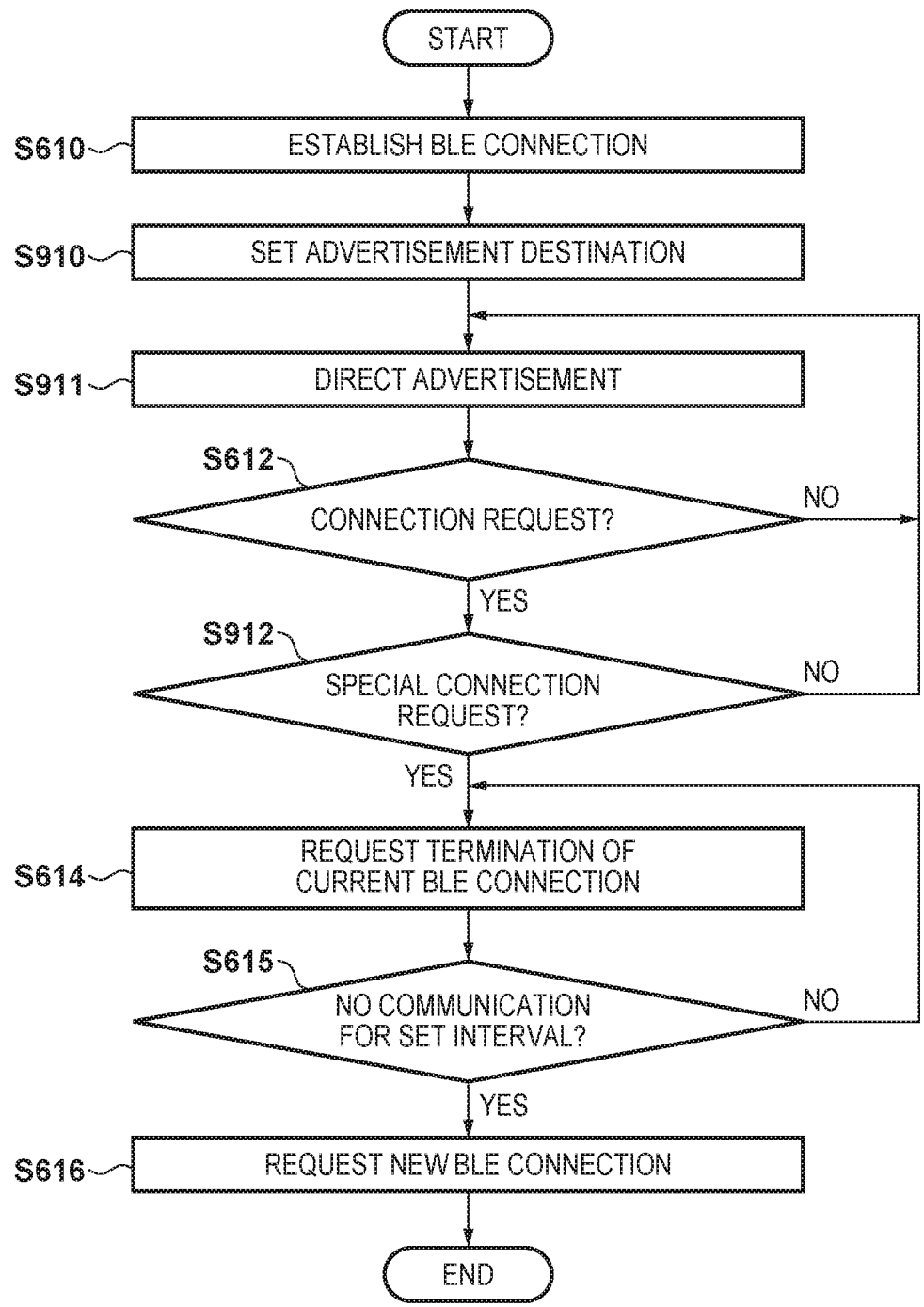
FIG. 9 is a flowchart illustrating a connected device switching process carried out by a digital camera according to the second embodiment.

A sequence of operations carried out by the digital camera A100 for implementing the sequence illustrated in FIG. 8 will be described next with reference to FIG. 9. FIG. 9 illustrates a sequence of operations performed by the digital camera A100 according to the present embodiment in the process of switching the connected device.

In step S910, the control unit A101 sets a destination for the direct advertisement. Specifically, the control unit A101 sets the devices from which device information was obtained in step S208, with the exception of the smartphone B100 that is currently connected, as destinations of the direct advertisement.

In step S911, the control unit A101 sends the direct advertisement to the device set as the destination of the direct advertisement (the tablet C100, in the example illustrated in FIG. 8).

In step S912, the control unit A101 determines whether the advertiser address included in the connection request packet received in step S612 matches the special advertiser address communicated in step S319. If the control unit A101 determines that the advertisement addresses match, the process moves to step S614. However, if it is determined that the advertisement addresses do not match, the process returns to step S911.

Then, if it has been determined that the special advertisement addresses match, the control unit A101 carries out the processes of S519 to S521, establishes a connection with the tablet C100, and ends the sequence of operations.

Sequence of Operations by Tablet C100

A sequence of operations carried out by the tablet C100 to implement the sequence illustrated in FIG. 8 will be described next. The sequence of operations carried out by the tablet C100 in the present embodiment is the same as the operations illustrated in FIG. 7 and described above. In other words, the processes of steps S710 to S713 are executed in the same manner as in the first embodiment.

In step S714, the control unit C101 sends the connection request packet 250, including the special advertisement address, through the low-power wireless communication unit C121. At this time, the special advertiser address stored in the non-volatile memory C103 in step S420 is used in the advertiser address 252 included in the connection request packet 250. The control unit C101 then carries out the processes of steps S715 to S717 and ends the sequence of operations.

According to the present embodiment as described thus far, if, when a digital camera has a connection established with a first central device, the digital camera receives a new connection request from a second central device, the connection is switched in accordance with an advertiser address included in the connection request from the second device. At this time, the digital camera generates a value unique to each central as a special advertiser address and communicates that special advertiser address to the central devices, and thus a distinction can be made between a normal advertiser address and a special advertiser address included in a connection request from a central device. Doing so makes it possible for the user to control the connection made by the digital camera A100 simply by operating the device to which the digital camera is to be connected (e.g. the second central device). To rephrase, the connection of a peripheral device connected to a central device can be easily switched to a connection with a desired unconnected central device.

In the above-described embodiment, the configuration is such that the special advertiser address is generated by the digital camera A100 and communicated to the smartphone B100 and the tablet C100. However, the configuration may instead be such that the special advertiser is generated by the smartphone B100 or the tablet C100 and communicated to the digital camera A100.

Furthermore, the present embodiment describes an example in which the connection of the digital camera A100 is switched unconditionally in response to a switch instruction operation made by the user in the tablet C100. However, the configuration may be such that when the connection request made by the tablet C100 is ignored by the digital camera A100, the user is notified that the digital camera A100 is already connected to another device and is asked if s/he nevertheless wishes to switch the connection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094876, filed May 11, 2017, which is hereby incorporated by reference herein in its entirety.

What is claimed is:

1. A communication apparatus comprising:
at least one processor or circuit configured to perform operations of following units:
a communication unit configured to establish a connection with an external device for communication; and
a control unit configured to control, in accordance with information pertaining to a connection request received from a second external device while a connection is established with a first external device, whether or not to cause the communication unit to establish a connection with the second external device instead of the first external device,
wherein the control unit causes a connection to be established with the second external device in a case where the information pertaining to the connection request includes information shared in advance with the second external device instead of predetermined information specifying a device to be connected.

2. The communication apparatus according to claim 1, wherein while the connection with the first external device is established, the control unit further controls the communication unit to send a beacon signal to the external device including at least the second external device, and the communication unit receives the connection request from the external device sent in response to receiving the beacon signal.

3. The communication apparatus according to claim 2, wherein while the connection with the first external device is established, the control unit controls the communication unit to send the beacon signal specifying a destination external device.

4. The communication apparatus according to claim 1, wherein the information pertaining to the connection request received from the second external device includes the predetermined information specifying a device to be connected in a case where a connection with the first external device is not established by the communication unit.

5. The communication apparatus according to claim 1, wherein the communication unit receives the connection request including the information shared in advance with the second external device in response to a predetermined user operation being received by the second external device.

6. The communication apparatus according to claim 1, wherein the information shared in advance with the second external device is information generated by the control unit and sent to the second external device by the communication unit.

7. The communication apparatus according to claim 1, wherein the information shared in advance with the second external device is information generated by the second external device and received through the communication unit.

8. The communication apparatus according to claim 2, wherein while the connection with the first external device is established, the control unit controls the communication unit not to send the beacon signal in a case where there are no other external devices that have been paired.

9. The communication apparatus according to claim 1, wherein the control unit further controls the communication unit to send, to an external device, a notification indicating that information to be shared in advance, which is to be included in the information pertaining to the connection request, can be obtained.

10. The communication apparatus according to claim 1, wherein the predetermined information specifying a device to be connected is an initiator address specifying the second external device as a source of the connection request.

11. The communication apparatus according to claim 1, wherein the predetermined information specifying a device to be connected is an advertiser address specifying the communication apparatus as a source of an advertisement made through a beacon signal.

12. The communication apparatus according to claim 1, wherein the communication unit does not establish simultaneous connections with a plurality of external devices.

13. The communication apparatus according to claim 1, wherein the communication unit establishes a Bluetooth Low Energy (BLE) connection and communicates with one of a plurality of external devices including the first external device and the second external device; and
in the BLE connections, the first external device and the second external device are centrals and the communication apparatus is a peripheral.

14. A communication apparatus comprising:
at least one processor or circuit configured to perform the operations of following units:
a communication unit configured to establish a connection with an external device to communicate with the external device;

an operating unit configured to receive, while a first external device has established a connection with a second external device, a predetermined user operation for sending a connection request in response to a beacon signal sent from a first communication apparatus; and a control unit configured to control the communication unit to send the connection request to the first external device in response to the predetermined user operation being received, wherein the control unit controls the communication unit to send, to the first external device, the communication request including information shared in advance with the first communication apparatus instead of predetermined information specifying a source device.

15. A control method of a communication apparatus comprising:

establishing a connection with an external device to communicate with the external device; and controlling, in accordance with information pertaining to a connection request received from a second external device while a connection is established with a first external device, whether or not to cause a connection to be established with the second external device instead of the first external device, wherein in the controlling, a connection is caused to be established with the second external device in a case where the information pertaining to the connection request includes information shared in advance with the second external device instead of predetermined information specifying a device to be connected.

16. A non-transitory computer-readable storage medium storing a program for causing a computer to execute a control method of a communication apparatus comprising:

establishing a connection with an external device to communicate with the external device; and controlling, in accordance with information pertaining to a connection request received from a second external device while a connection is established with a first external device, whether or not to cause a connection to be established with the second external device instead of the first external device, wherein in the controlling, a connection is caused to be established with the second external device in a case where the information pertaining to the connection request includes information shared in advance with the second external device instead of predetermined information specifying a device to be connected.

* * * * *